(12) United States Patent
Estes

(10) Patent No.: US 11,240,310 B2
(45) Date of Patent: Feb. 1, 2022

(54) GROUP SMART SENSOR MANAGEMENT SERVICE

(71) Applicant: Itron, Inc., Liberty Lake, WA (US)

(72) Inventor: Jason Estes, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 324 days.

(21) Appl. No.: 16/156,686

(22) Filed: Oct. 10, 2018

(65) Prior Publication Data

US 2020/0120160 A1    Apr. 16, 2020

(51) Int. Cl.
  *H04L 29/08*    (2006.01)
  *G06F 3/0484*   (2013.01)
  *G06F 9/30*     (2018.01)

(52) U.S. Cl.
  CPC ......... *H04L 67/12* (2013.01); *G06F 3/04847* (2013.01); *G06F 9/30* (2013.01)

(58) Field of Classification Search
  CPC ......... H04L 67/12; G06F 3/04847; G06F 9/30
  USPC ............................................. 702/188
  See application file for complete search history.

(56) References Cited

U.S. PATENT DOCUMENTS

| | | | | |
|---|---|---|---|---|
| 6,327,541 | B1* | 12/2001 | Pitchford | G01D 4/004 702/62 |
| 8,290,727 | B2* | 10/2012 | Kreiss | H02J 3/14 702/60 |
| 2009/0281679 | A1* | 11/2009 | Taft | G01D 4/004 700/297 |
| 2012/0136497 | A1* | 5/2012 | Subbloie | G06Q 50/06 700/291 |
| 2013/0144453 | A1* | 6/2013 | Subbloie | G06Q 50/06 700/291 |
| 2013/0184885 | A1 | 7/2013 | Keil et al. | |
| 2013/0205022 | A1 | 8/2013 | Kagan et al. | |
| 2014/0371922 | A1* | 12/2014 | Weaver | G05B 15/02 700/276 |
| 2015/0186904 | A1* | 7/2015 | Guha | G06Q 50/06 705/7.26 |
| 2017/0001653 | A1* | 1/2017 | Ferencz, Jr. | B61L 27/0094 |
| 2018/0020270 | A1 | 1/2018 | Colonna et al. | |
| 2019/0101911 | A1* | 4/2019 | Katz | G05B 23/0251 |

OTHER PUBLICATIONS

PCT Search Report, and Written Opinion dated Nov. 28, 2019 for PCT Application No. PCT/US2019/055714, 12 pages.

* cited by examiner

*Primary Examiner* — Ricky Go
(74) *Attorney, Agent, or Firm* — Lee & Hayes, P.C.

(57) ABSTRACT

A smart sensor group management service may be used to establish groups of smart sensors that are associated with one or more common characteristics, such as a common application associated with the smart sensors. The group management service may establish multiple physical groups per application so that multiple entities may have access to managing the groups. The physical groups may be associated with a virtual group that facilitates management of the physical groups and may be accessible by the entities. The entities may perform different types of management operations using the group management service, such as creating groups, adding smart sensors to groups, removing smart sensors from groups, and adjusting settings of features of the applications that are associated with the groups.

20 Claims, 11 Drawing Sheets

GROUP SMART SENSOR MANAGEMENT SERVICE

BACKGROUND

Utility meters such as electric, water, and natural gas meters have evolved from isolated devices that simply measure utility consumption and display a consumption reading to so called "smart meters" that are connected devices capable of reporting resource consumption readings automatically over a utility communication network. Such meters utilize increasingly complex and specialized software to perform required functions. Multiple entities may have the ability to communicate with these meters and to configure aspects of the meters. Unfortunately, existing management solutions have not enabled efficient management of these meters by multiple entities.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Overview of System Architecture

Figure 1:
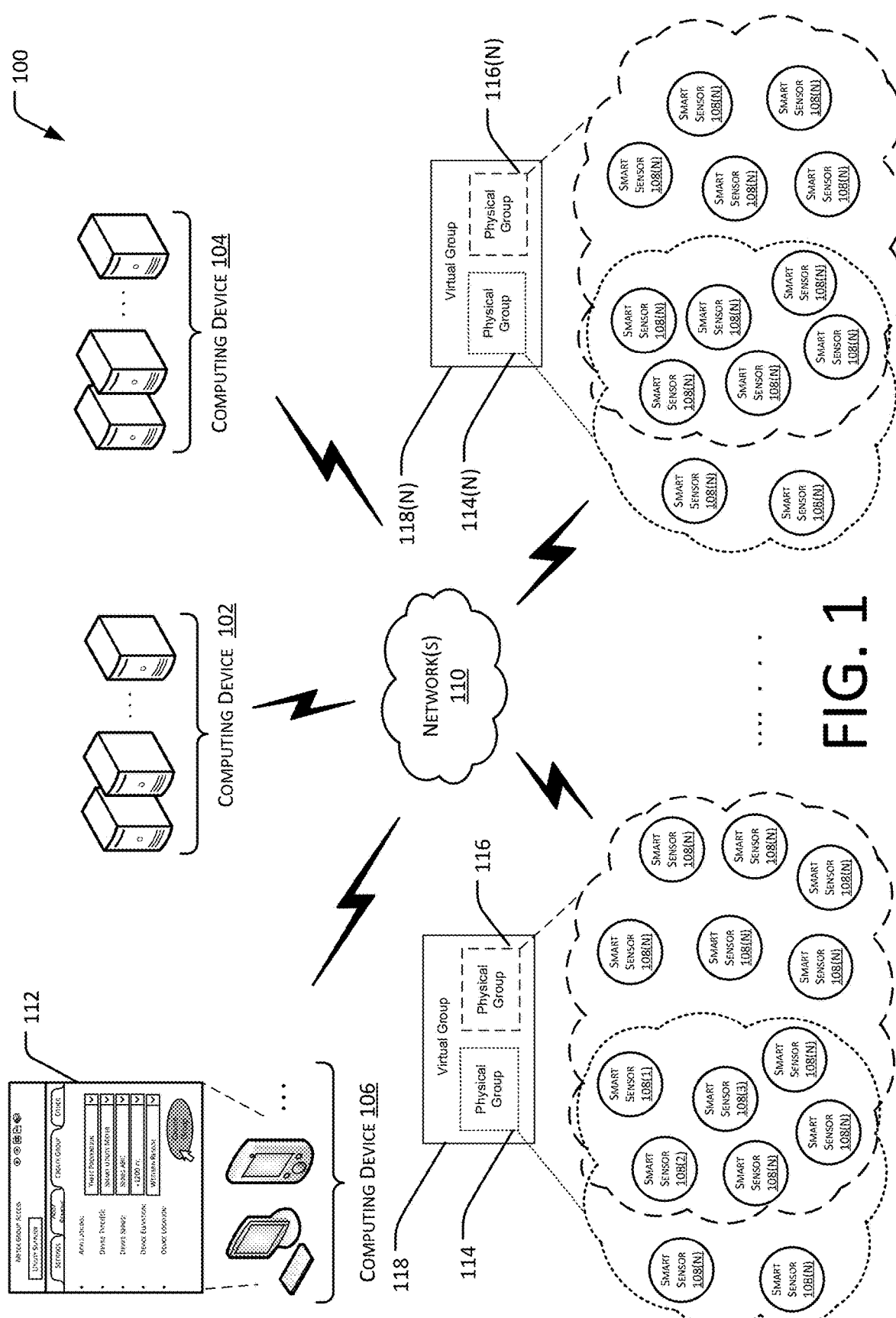
FIG. 1 is a schematic diagram of an example architecture usable to facilitate management by multiple entities of groups of one or more smart utility meters or other smart sensors.

Existing systems make it difficult for multiple entities to manage and administer groups of one or more smart sensors. For example, a first entity may want to collect a certain type of data from a group of smart sensors that is different than a type of data that a second entity may want to collect. As another example, the smart sensors of interest to the first entity may not be identical to the second entity (e.g., the groups may have some meters in common and other meters that are not in common).

This application describes techniques for enabling multiple entities to jointly manage and administer groups of one or more smart sensors. The multiple entities may include a first entity and a second entity. The multiple entities may be able to communicate with and configure some or all of the smart sensors. As used herein, the term "smart sensor" means a measuring and/or sensing equipment which measures or senses physical parameters (e.g., energy, power, voltage, power factor, temperature, gas pressure, flow rate, etc.) and has the ability to communicate this information via a network. By way of example and not limitation, smart sensors may include utility meters (e.g., electricity, water, or gas meters), relays, repeaters, smart grid routers, transformers or any such utility network computing device.

In some examples, the first entity may comprise a manufacturer, vendor, supplier, or other third-party that provides, services, or administers at least a portion of the distribution network and/or the communication network or that provides a group management service.

In some examples, the second entity may be a utility supplier entity that provides a physical resource such as electricity, water, or gas to one more sites via a physical distribution network (e.g., the wires and pipes through which the resource passes to reach the sites). Smart sensors may be disposed at the one or more sites to measure consumption of the resource at the sites. The second entity may be in communication with the smart sensors via one or more communication networks (e.g., wired and/or wireless networks arranged in mesh, star, or other topologies). Both the first entity and the second entity may have the ability to communicate with and configure aspects of some or all of the smart sensors via the communication network.

In some examples, a computing device associated with the first entity may store and operate one or more applications that may be associated with a smart sensor or a group of smart sensors and that may receive information from the smart sensor or the group of smart sensors. In some cases, the applications may receive information from features or agents (e.g., software running on the meters) that operate on the smart sensors. The first entity may establish groups of smart sensors that are associated with a particular application such that the features operating at the smart sensor(s) provide information to the application operating at the computing device associated with the first entity based on the type of application with which the group of meters is associated. In some cases, the first entity may adjust a setting of a feature that runs on certain smart sensors without adjusting the setting on other smart sensors. The features that run on the smart sensors may, among other things, collect data that pertains to the smart sensor (e.g., meter reading data) or the environment in which the smart sensor is located, and the smart sensor may transmit the data to the application stored on the computing device associated with the first entity via the communication network. Searching for individual smart sensors and smart sensor features in a database and sending individual transmissions to each smart sensor is costly and inefficient. This application describes techniques to organize smart sensors into groups for ease of management. For instance, a group may be established corresponding to smart sensors that each are associated with the same application in order to more efficiently adjust the settings of features by applying the adjustments to the entire group of smart sensors as opposed to individual smart sensors.

In some cases, more than one entity of the multiple entities may be interested in establishing groups of smart sensors associated with an application and/or accessing data provided by the features that run on the smart sensors. Previously, a first entity may have collected data from feature running on a smart sensor. Then, unbeknownst to the first entity, a second entity may have accessed the feature and adjusted settings of the feature in order to collect a different type of data, causing the integrity of the data that the first entity wishes to be collected to be compromised. This application describes techniques to allow multiple entities to create and manage groups of smart sensors without sending conflicting instructions to the groups of smart sensors notifying them of which group they are in or of an adjusted setting of a feature running on the smart sensors. The techniques described herein enable multiple entities to efficiently jointly manage groups of one or more smart sensors by, for example, creating groups, adding smart sensors to groups, removing smart sensors from groups, and adjusting settings of features that are associated with an application and that are being run on the smart sensors in the groups. To enable joint management by multiple entities, this application describes a group management service that allows individual entities to create physical groups including one or more smart sensors relevant to the respective individual entities. Each physical group may be associated with an application that is associated with features running on the smart sensors in the respective physical group. The group management service associates multiple physical groups that share one or more smart sensors, applications, and/or features in common and stores this association as a virtual group. Thereafter, the group management service may present the virtual group to a user associated with an entity based on a credential or a permission of the user. Any changes made by the user to the virtual group can be applied to the physical group that corresponds to the entity that is associated with the user. In this way, the virtual group may present a user interface to a user based on which entity the user is associated with and, in turn, which physical group the user is associated with such that the user only has access to the smart sensors associated with that physical group and to certain settings of features. Additionally, or alternatively, the user interface presented to the user may be based on the user's role within the entity. Limiting the user's access to certain information in the system creates less errors in the system and reduces network traffic, requires less bandwidth, and optimizes the user interface presented to the user, which improves the overall performance of the computers operating in the system.

As used herein, the term "application" or "app" means any software or firmware capable of executing on a computing device. Examples of applications include, without limitation, an operating system, an update to an operating system, a software program, an update of a software program, an add-on to a software program, a patch, a plugin, a driver, a firmware image, or a firmware update.

While many of the examples herein are described in the context of two entities, in other examples, the multiple entities may include three or more entities. Additionally, while the examples herein describe the multiple entities including a utility supplier entity and a third-party entity, in other examples the multiple entities may include any combination of these and/or other entities.

Overview of Creating a Group

In one aspect, a user associated with the first entity or the second entity may access a group management service via a user interface and request to create a group that is associated with an application. The request may specify a characteristic of a smart sensor (e.g., device type, model, series, location, elevation, etc.) necessary in order to have the smart sensor included in the group. The group management service may create two physical groups, a first entity physical group and a second entity physical group each associated with the first entity and the second entity, respectively. The group management service may also create a virtual group that associates both the first entity physical group and the second entity physical group. After the two physical groups are created, the group management service may send an instruction to a computing device, such as a service associated with one of the first entity or the second entity, to create the first entity physical group and the second entity physical group and for them to be stored at the computing device. The group management service may then create settings for the features that are associated with the application that is associated with the virtual group. For example, an application may be associated with theft prevention, data collection, demand response, impedance detection, or residential broken neutral detection (e.g., monitoring a neutral line of a meter) and may include features such as location awareness, metrology information, reporting schedules, impedance connection bypass information, detection of theft by meter bypass information, load disaggregation information, significant change detection information (e.g., detecting significant changes in current when loads are turned on or off), service impedance information, command execution information, or broken neutral information and/or other information. The settings may change the configuration of the features such that the user may customize the features based on the type of information they want to collect or the frequency at which they want information collected or transmitted.

Overview of Adding or Removing a Smart Sensor to a Group

In another aspect, a user associated with the first entity or the second entity may access the group management service via a user interface and request to add a smart sensor to an existing group. For example, the group management service may determine a credential and/or a permission of the user accessing the user interface and the user interface may present a list of virtual groups associated with the user based on the credential and/or permission. The user may select one of the groups and may request that a specific smart sensor or multiple smart sensors be added to the group or removed from the group. The group management service may determine that the user is either associated with the first entity or the second entity based on the credential and/or the permission and may add the smart sensor or remove the smart sensor from the physical group that is associated with the user. For example, if the user is associated with the first entity, then the group management service may update the first entity physical group to reflect the added smart sensor.

Overview of Adjusting a Setting of a Feature

In another aspect, a user associated with the first entity or the second entity may access the group management service via a user interface and request to adjust a setting of a feature that is used in an application. For example, the group management service may determine a credential and/or a permission of the user accessing the user interface and the user interface may present a list of adjustable settings of features associated with an application based on the credential and/or permission. In some cases, the group management service may present a virtual group to the user and only allow the user access to settings that are associated with the physical group that corresponds to the entity that is associated with the user. For example, if the user is associated with the first entity and is accessing the user interface and wishes to adjust a setting for a feature, then the virtual group may reflect the current settings for the first entity physical group. Once the settings have been adjusted, the virtual group may update the first entity physical group to include the adjustments.

Example Utility System

FIG. 1 is a diagram illustrating an example networked environment or architecture 100 including a computing device 102 and a computing device 104. The computing device 102 and the computing device 104 may be utilized, via a computing device 106, to receive requests to organize one or more smart sensors 108 or other smart sensors 108(1), 108(2), 108(3), . . . 108(N) (collectively referred to as "smart sensors 108"), where N is any integer greater than or equal to 1, into groups to be associated with applications and adjusting settings of features stored on the smart sensors 108. In some examples, the computing device 102 may be associated with a first entity, such as a manufacturer, vendor, supplier, or other third-party that provides, services, or administers at least a portion of the distribution network and/or the communication network or that provides a group management service. In some examples, the computing device 104 may be associated with a second entity, such as a utility supplier entity that provides a physical resource such as electricity, water, or gas to one more sites via a physical distribution network (e.g., the wires and pipes through which the resource passes to reach the sites). Both the computing device 102 and the computing device 104 may have the ability to communicate with and configure aspects of some or all of the smart sensors 108 via a wired or wireless network 110.

The term "smart sensor" means a measuring and/or sensing equipment which measures or senses physical characteristics (e.g., energy, power, voltage, power factor, temperature, gas pressure, flow rate, etc.) and has the ability to communicate this information via a network. By way of example and not limitation, smart sensors may include utility meters (e.g., electricity, water, or gas meters), relays, repeaters, smart grid routers, transformers or any such utility network computing device. The smart sensors 108 may be in communication by wireless (e.g., radio frequency) and/or wired (e.g., power line communication, Ethernet, serial, etc.) connections and may be configured to collect information (e.g., resource consumption information, network traffic information, weather information, etc.) and to report the collected information to the computing device 102 or the computing device 104 via the wired or wireless network 110, such as the Internet, a cellular network, or the like. The network 110 may itself be made up of one or more other wired and/or wireless networks.

Referring back to FIG. 1, a user (e.g., a first entity employee, second entity employee, consumer, or other user) may access a user interface 112 using the computing device 106. Using a web browser or an app store client program resident on computing device 106, the user may access a website or other interface to a smart sensor group management service that may be operated by the computing device 102. For instance, the user interface 112 may present options to the user for creating groups, adding smart sensors to existing groups, removing smart sensors from existing groups, or adjusting feature settings that are installed on the smart sensors 108 in an existing group. The user interface 112 may request a credential, such as a username or a password, of the user when accessing the user interface 112 to determine an identity of the user or an association of the user with one or more entities. The user may request to establish a group of smart sensors 108 for an application to be associated with. Once the identity or the association of the user is known and the credential and/or permission of the user is known, the computing device 102 may establish a first physical group 114 that is associated with the user that initially accessed the user interface 112 and a second physical group 116 that is associated with a different user (e.g., the computing device 104). In cases where the user is associated with the computing device 104, then the first physical group 114 may be associated with the computing device 104 and the second physical group 116 may be associated with the computing device 102. The physical groups 114 and 116 may each comprise a number of smart sensors 108 selected by the user. Establishing the physical groups 114 and 116 may cause the smart sensors 108 that make up each of the physical groups 114 and 116 to adjust settings of features that are stored on the smart sensors 108 based on an application selected by the user. The applications may be used for collecting data and transmitting the data to the computing device 102 or the computing device 104. For instance, the applications may be associated with theft detection, utility testing, demand response, etc. Each application may be associated with features related to the type of application. Each feature may provide a different type of information to the entity in which it is communicating with (e.g., the computing device 102 or the computing device 104). Once the physical groups 114 and 116 have been established, the group management service may establish a virtual group 118 that includes information pertaining to the physical groups 114 and 116. For instance, the virtual group 118 may be associated with an application and may contain identification information for each physical group that the virtual group 118 is associated with and an entity that is associated with each physical group.

In some embodiments, once the physical group 114, the physical group 116, and the virtual group 118 have been established, the group management service may allow multiple users to manage the smart sensors 108 that make up the physical groups 114 and 116. For instance, when a user accesses the user interface 112, the group management service may determine an association of the user and determine a credential and/or a permission of the user. Once the credential and/or permission of the user is determined, the group management service may present, via the user interface 112, the virtual group 118 displaying different options for managing either the physical group 114 or the physical group 116, depending on the association of the user. In one example, if the user is associated with a first entity and the physical group 114 is also associated with the first entity, then the user interface 112 may present information that pertains to the physical group 114. Alternatively, if the user is associated with a second entity and the physical group 116 is also associated with the second entity, then the user interface 112 may present information that pertains to the physical group 116. In some examples, the user may add or remove one or more smart sensors 108 from their respective group via the virtual group 118. As illustrated in the example architecture 100, this may lead to the physical group 114 including a different set of smart sensors 108 than the physical group 116, even though the smart sensors 108 in both of the physical groups 114 and 116 have the same features associated with the application and are associated with the same virtual group 118. There may be any number of virtual groups 118(N) and any number of physical groups 114(N) and physical groups 116(N) that are associated with the virtual group 118(N), where N is any number greater than or equal to 1.

In the example of FIG. 1, the user interface 112 includes multiple tabs, each representing a different category of management. In the illustrated example, four tabs are shown: settings, add/remove, create group, and other. In response to selection of each tab, the user interface 112 may display different options for managing a group of smart sensors. However, the interface 112 may be configured in any other way suitable to present the management options that are available from the group management service. For instance, instead of having multiple tabs for different categories of users on a single interface, the user interface 112 may display options using a tree-view.

Figure 2:
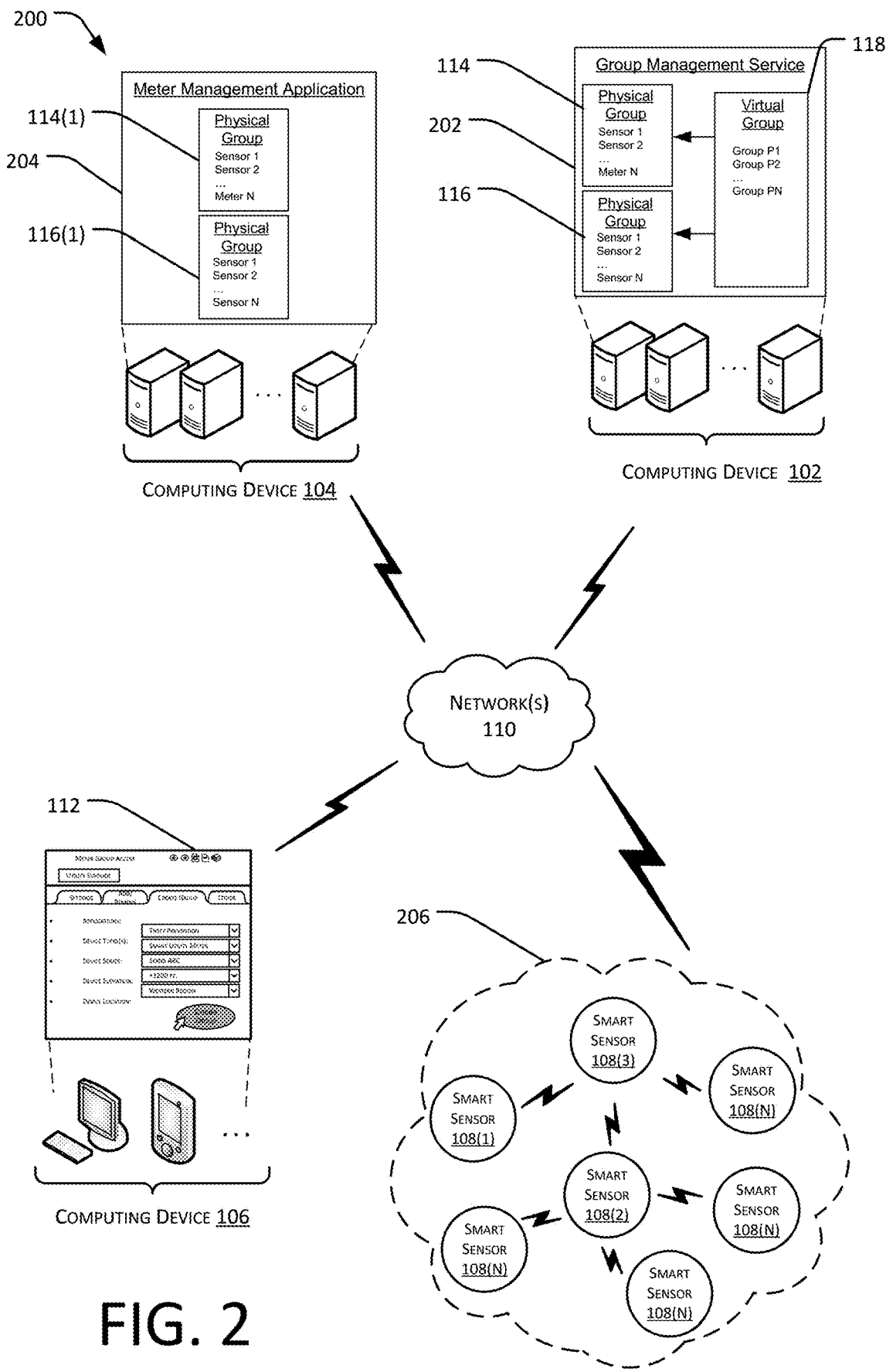
FIG. 2 is a schematic diagram of another example architecture usable to facilitate management by multiple entities of groups of one or more smart utility meters, smart sensors, or other network computing devices.

FIG. 2 is a diagram illustrating another example networked environment or architecture 200, illustrating a group management service 202 operated by the computing device 102 and a meter management application 204 operated by the computing device 104. Like the architecture 100 of FIG. 1, architecture 200 also includes the computing device 106, the network 110 and the smart sensors 108. A user (e.g., a first entity employee, second entity employee, consumer, or other user) may access a user interface 112 using the computing device 106. The user interface 112 may provide access to the group management service 202 operated by the computing device 102. The group management service 202 may cause presentation of the user interface 112 on the computing device 106 and may be configured to receive instructions from the user. In some examples, the instructions may include a request to establish a group 206 comprising smart sensors 108. In response to receiving the request, the group management service 202 may create the physical group 114, the physical group 116, and the virtual group 118. Each of the physical groups 114 and 116 may be associated with different entities. For instance, the physical group 114 may be associated with a first entity and the physical group 116 may be associated with a second entity. The virtual group 118 may include a listing of each physical group and their respective associations. Although the example in FIG. 2 shows two physical groups listed in the virtual group 118, there may be any number of physical groups N listed in the virtual group 118, where N is any integer greater than or equal to 1. Additionally, although only two sensors are listed in each of the physical groups 114 and 116, there may be any number of sensors N listed in the physical groups 114 and 116, where N is any integer greater than or equal to 1. Once the physical group 114, the physical group 116, and the virtual 118 have been established, the group management service 202 may send a transmission to the computing device 104 causing the meter management application 204 that is operated by the computing device 104 to establish a physical group 114(1) and a physical group 116(1) and store them at the computing device 104. After the physical group 114(1) and the physical group 116(1) have been established at the computing device 104, the meter management application 204 may send a transmission to the smart sensors 108 that are part of the group 206 causing the smart sensors 108 to adjust settings of features that are stored on the smart sensors 108 based on a type of application that is associated with the virtual group 118.

In some examples, the instructions from the user may include a request to add or remove a smart sensor 108 from the group 206. In this case, the group management service 202 may determine a credential and/or a permission of a user based on an association of the user with an entity. The group management service 202 may present a list of virtual groups based on the credential and/or permission of the user, each virtual group being associated with a different application and multiple physical groups. The user may select a virtual group (e.g., the virtual group 118) and select a specific smart sensor 108 or may select multiple smart sensors 108 to either add or remove from virtual group 118. The group management service 202 may determine which physical group that the user is associated with based on the credential and/or permission of the user. If the user selects to add a smart sensor 108 or multiple smart sensors 108 and the user is associated with the physical group 114, then the group management service 202 may update the physical group 114 to reflect the added smart sensor(s) 108. If the user selects to add a smart sensor 108 or multiple smart sensors 108 and the user is associated with the physical group 116, then the group management service 202 may update the physical group 116 to reflect the added smart sensor(s) 108. Once either of the physical groups 114 or 116 are updated, the group management service 202 may send a transmission to the meter management application 204 stored at the computing device 104 causing the respective physical groups 114(1) and 116(1) to also be updated. The meter management application 204 may send a transmission to the selected smart sensor(s) 108 causing the smart sensor(s) 108 to adjust settings of features that are stored on the smart sensors 108 based on a type of application that is associated with the virtual group 118. Alternatively, if the user selects to remove a smart sensor 108 or multiple smart sensors 108 then the computing device 104 may send a transmission to the selected smart sensor(s) 108 causing the smart sensor(s) 108 to deactivate features that are associated with the group 206.

In some examples, the instructions from the user may include a request to adjust a setting of a feature that is associated with the application associated with the virtual group 118. An application may be associated with multiple features with settings that are adjustable by the computing device 104 or the computing device 102. Features may include periodically communicating with the computing device 102 or the computing device 104, a location awareness feature (e.g., GPS, GNSS, etc.), metrology information, reporting schedules, impedance connection bypass information, detection of theft by meter bypass information, load disaggregation information, significant change detection information, service impedance information, command execution information, broken neutral information, and/or other information. In one example, the group management service 202 may determine a credential and/or a permission of a user based on an association of the user with an entity. The group management service 202 may present a list of virtual groups based on the credential and/or permission of the user, each virtual group being associated with a different application and multiple physical groups. The user may select a virtual group (e.g., the virtual group 118) and a feature from a list of features of the application that is associated with the selected group. The group management service 202 may present different settings that can be adjusted by the user based on the credential and/or the permission of the user. For instance, if the group management service 202 determines that the user is associated with a first entity, then the group management service 202 may cause the user interface 112 to only present features that are associated with the physical group associated with the first entity (e.g., physical group 114). Alternatively, if the group management service 202 determines that the user is associated with the second entity, then the group management service 202 may cause the user interface 112 to only present features that are associated with the physical group of the second entity (e.g., physical group 116). Each physical group 114 and 116 may include different settings for features that are adjustable by their respective associated user such that a user associated with the first entity may adjust a set of features associated with the application that are different than a set of features that may be adjusted by a user associated with the second entity. In some instances, a user associated with the first entity may have access to a physical group that it is not associated with and may have the authority to adjust settings that are not included in the physical group that it is associated with. For instance, a user associated with the first entity may access a physical group of the second entity (e.g., physical group 114) and may adjust settings of the features included in the physical group of the second entity. Regardless of the credential and/or permission of the user or of physical group associated with the setting, once the setting of the feature has been adjusted, the group management service 202 may transmit an instruction to the computing device 104 indicating that the setting has been adjusted and the computing device 104 may transmit an instruction to the smart sensor(s) 108 that the adjusted setting pertains to, causing the smart sensor(s) 108 to adjust the setting of the feature associated with the application.

Figure 3:
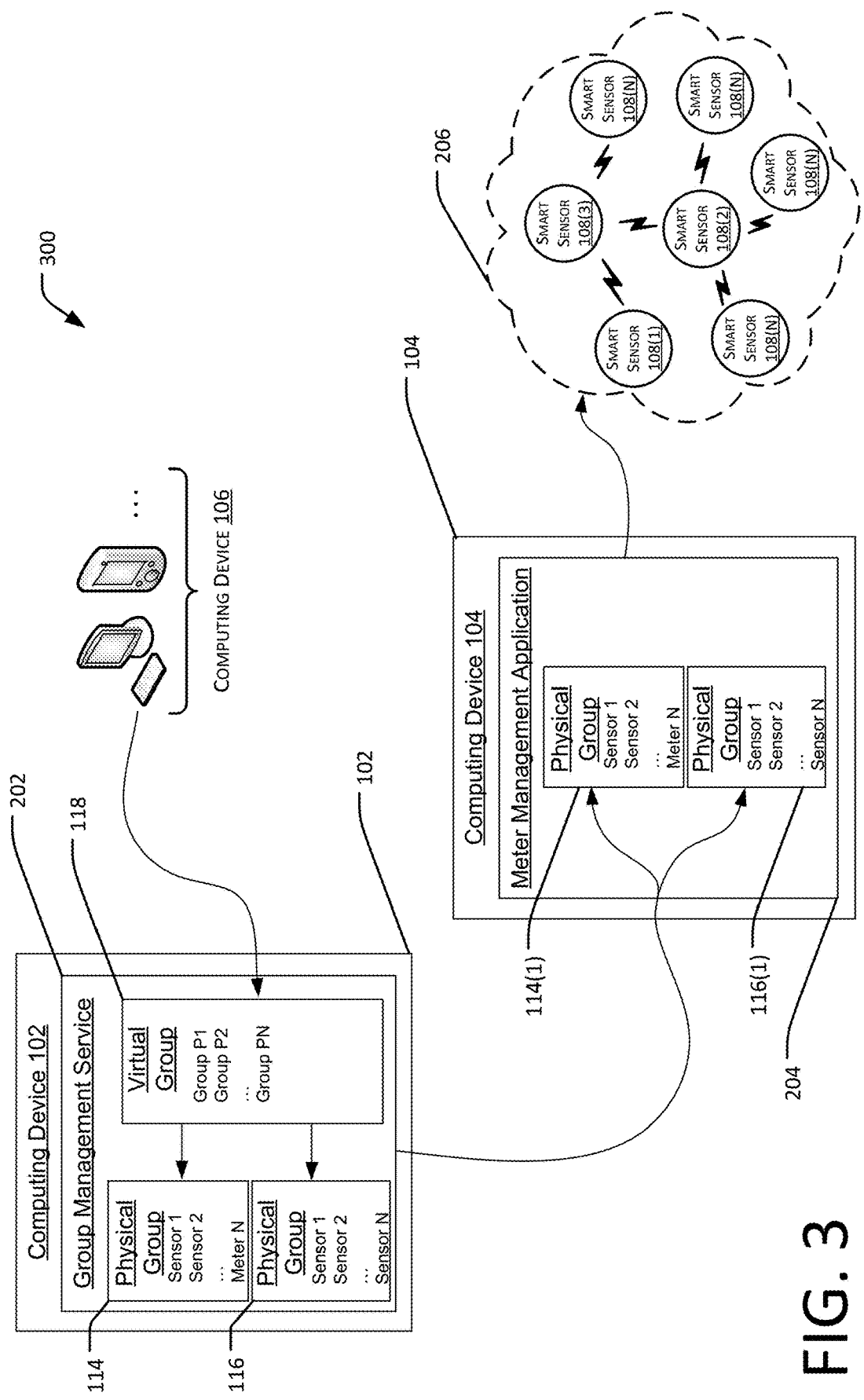
FIG. 3 is a schematic diagram of another example architecture usable to facilitate management by multiple entities of groups of one or more smart utility meters, smart sensors, or other network computing devices.

FIG. 3 is a diagram illustrating another example networked environment or architecture 300, illustrating a flow of communication between the computing device 106, the computing device 102, the computing device 104, and the smart sensors 108. A user may access the group management service 202 via a user interface, such as user interface 112, presented on the computing device 106. In this case, the group management service 202 may determine a credential and/or a permission of the user based on an association of the user with an entity. The group management service 202 may present a list of virtual groups based on the credential and/or permission of the user, each virtual group being associated with a different application and multiple physical groups. When the user accesses the virtual group 118 via the group management service 202, the group management service 202 may present from the physical group 114 or the physical group 116 based on which physical group corresponds to the entity that the user is associated with. In this way, the group management service 202 may present information to the user from the physical groups 114 and 116 based on a credential and/or permission of the user without giving the user direct access to the physical groups 114 and 116. The user may then select a management option presented by the group management service 202 (e.g., add a smart sensor to a group, remove a smart sensor from a group, adjust a setting of a feature associated with an application, etc.) and the group management service 202 may apply the selected option to the corresponding physical group. The group management service 202 may send a transmission to the computing device 104 causing the meter management application 204 of the computing device 104 to update the physical groups 114(1) and 116(1) to incorporate the selection(s) made by the user. Once the physical groups 114(1) and 116(1) have been updated, the computing device 104 may transmit an instruction to the corresponding smart sensor(s) 108 that were indicated in the selection(s) made by the user.

Example Computing Device 102

Figure 4:
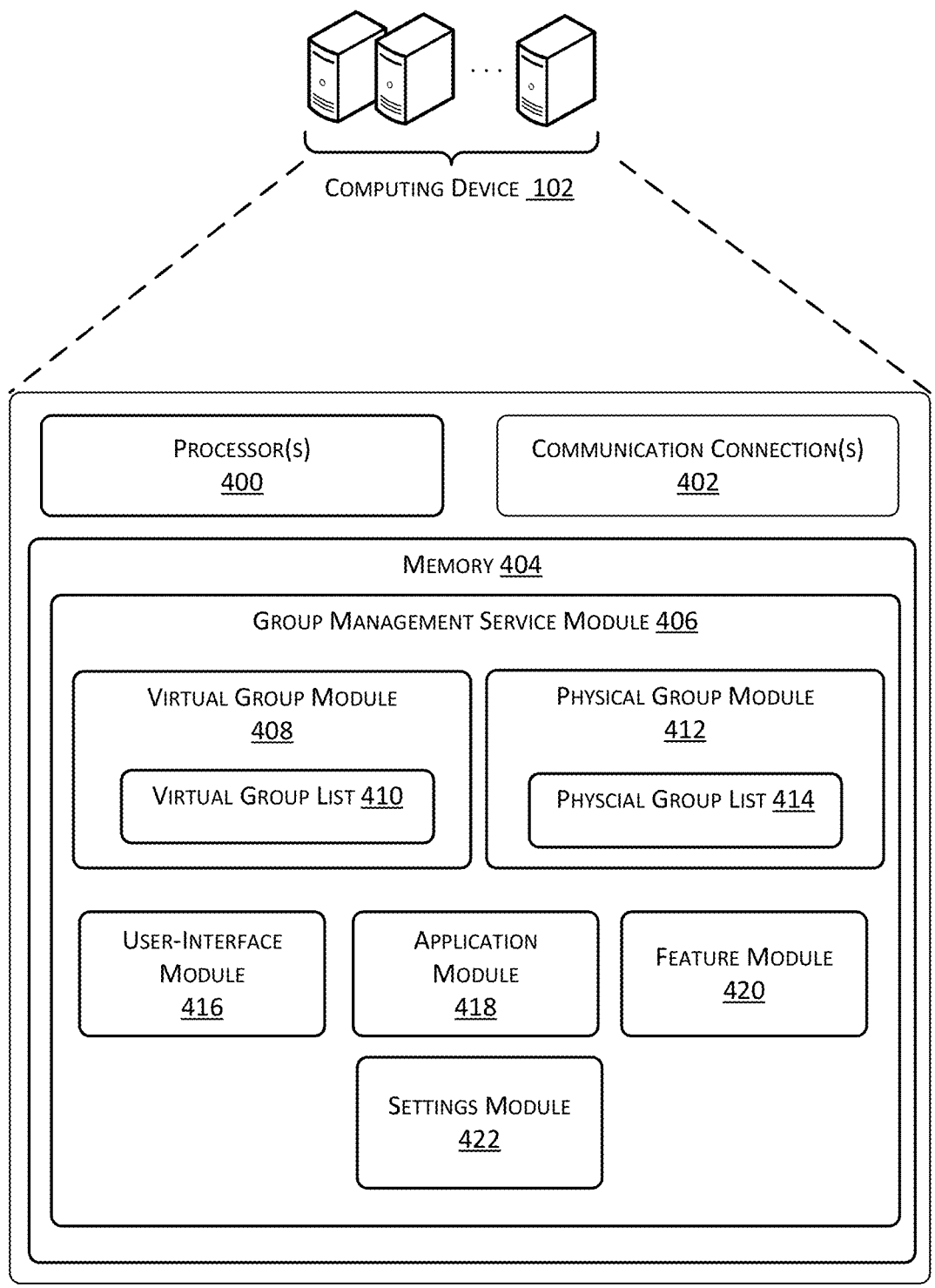
FIG. 4 is a block diagram illustrating details of an example of a first entity computing device, the first entity being an example of one of the multiple entities shown in FIG. 1.

FIG. 4 illustrates an example computing device 102 of FIG. 1 in more detail. The computing device 102 may be configured as or disposed at a server, a cluster of servers, a server farm, a data center, a cloud computing resource, or any other computing resource capable of storing and/or providing access to a group management service, such as the group management service 202. In some examples, the computing device 102 may be associated with a first entity which may comprise a manufacturer, vendor, supplier, or other third-party that provides, services, or administers at least a portion of the distribution network and/or the communication network or that provides a group management service. The computing device 102 may include one or more processors 400, one or more communication connections 402, and memory 404. The memory 404 may include a plurality of modules to implement various functions of the computing device 102. For instance, a group management service module 406 may store a virtual group module 408 that includes a virtual group list 410 and a physical group module 412 that includes a physical group list 414. The virtual group list 410 may store a list of virtual groups and the physical groups that correspond to each virtual group. The physical group list 414 may store a list of each physical group along with the corresponding smart sensors 108 of each physical group and an entity that is associated with each physical group. When a user creates a group, the group management service module 406 may establish two physical groups, such as physical group 114 and physical group 116, stored in the physical group module 412. Each physical group may be associated with different entities and may include the same application but may include different settings of the application. The group management service module 406 may also establish a virtual group, such as virtual group 118, that may be stored in the virtual group module 408 and that is associated with both of the physical groups. When a user interacts with the group management service module 406, the virtual group module 408 may determine an association of the user with an entity and a credential and/or permission of the user and may provide the user access to the information stored in the corresponding physical group via the virtual group, without providing direct access to the physical group itself.

A user interface module 416 may be configured to generate a graphical user interface (e.g., interface 112) presenting the group management options that are available. The user interface module 416 may make the interface available to one or more users by, for example, publishing the interface to a web site accessible by a browser of a client computing device. When accessed by the computing device, the user interface module 416 may serve the interface to the computing device displaying the group management options that are available along with controls usable to select the options.

An application module 418 may be configured to store applications and application related information that are selectable for applying to groups. The application module 418 may include an index having a listing of the applications by topic, category, feature, product, or the like. The application module 418 may also include metadata associated with the applications. By way of example and not limitation, the metadata may include, for each application, a category of the application, a version of the application, compatibility of the application with specific software and/or hardware, keywords associated with the applications, brief descriptions of the application, feature specifications of the application, or the like. For instance, a user may access the group management service 202 via the user interface 112 and may specify a smart sensor 108 or multiple smart sensors 108 to form a group. The user may select an application from multiple applications that are stored by the application module 418 to be associate with the group of smart sensors 108 and/or adjust settings of features that are stored on the smart sensors 108 based on a type of application that is selected. The features associated with the applications may run in the "background" of the smart sensors 108 and provide data to the computing device 102 or the computing device 104 that the computing device 102 or the computing device 104 may find beneficial. For example, the applications may be associated with theft detection, smart sensor testing, demand response, etc.

A feature module 420 may be configured to store features and feature related information that may be selectable when managing an application that is associated with a group. For instance, each application may have multiple features that are associated with the application. In some cases, these features may have been previously installed on the smart sensors 108. When a smart sensor 108 joins a group that is associated with an application, the smart sensor 108 may receive instructions to activate or deactivate certain features stored on the smart sensor 108 based on the nature of the application. In the case of a theft protection application, the features may include periodically communicating with the computing device 102 or the computing device 104, a location awareness feature (e.g., GPS, GNSS, etc.), measuring a utility consumption, etc. Each application may be associated with different features or a different combination of features that are specific for collecting data that pertains to the type of application associated with the group that the smart sensor(s) 108 is a member. In some cases, the feature module 420 may store features associated with programs other than applications. For instance, the feature module 420 may include features pertaining to configuration settings of the smart sensors 108, software updates, firmware updates, etc.

A settings module 422 may be configured to store settings for each feature of an application. For instance, each feature may have an adjustable setting that the user can change based on a type of data that the user would like to collect or a frequency in which the data should be collected. Each setting may be associated with a different physical group such that each setting may only be adjusted by a user associated with a single entity. In some cases, an entity may have permission to adjust settings associated with multiple physical groups. In the case of a theft protection application, the group management service 202 may enable the user to adjust a rate in which the smart sensor(s) 108 communicate with the computing device 104, adjust a level of certainty associated with a location awareness feature, adjust a level of precision associated with a location awareness feature, adjust a level of precision associated with measuring utility consumption, etc. Each feature may include different adjustable settings based on the type of feature included in the application.

The computing device 102 may also include one or more communication connections 402 to enable the computing device 102 to communicate with other computing devices locally or over the network 110. Examples of communication connections include, without limitation, power line communication (PLC) connections, Ethernet or other wired network connections, cellular communication connections, RF communication connections, or the like. As such, the computing device 102 also includes any ancillary hardware, modules, and/or interfaces associated with or needed for the operation of the particular communication connections.

Example Computing Device 104

Figure 5:
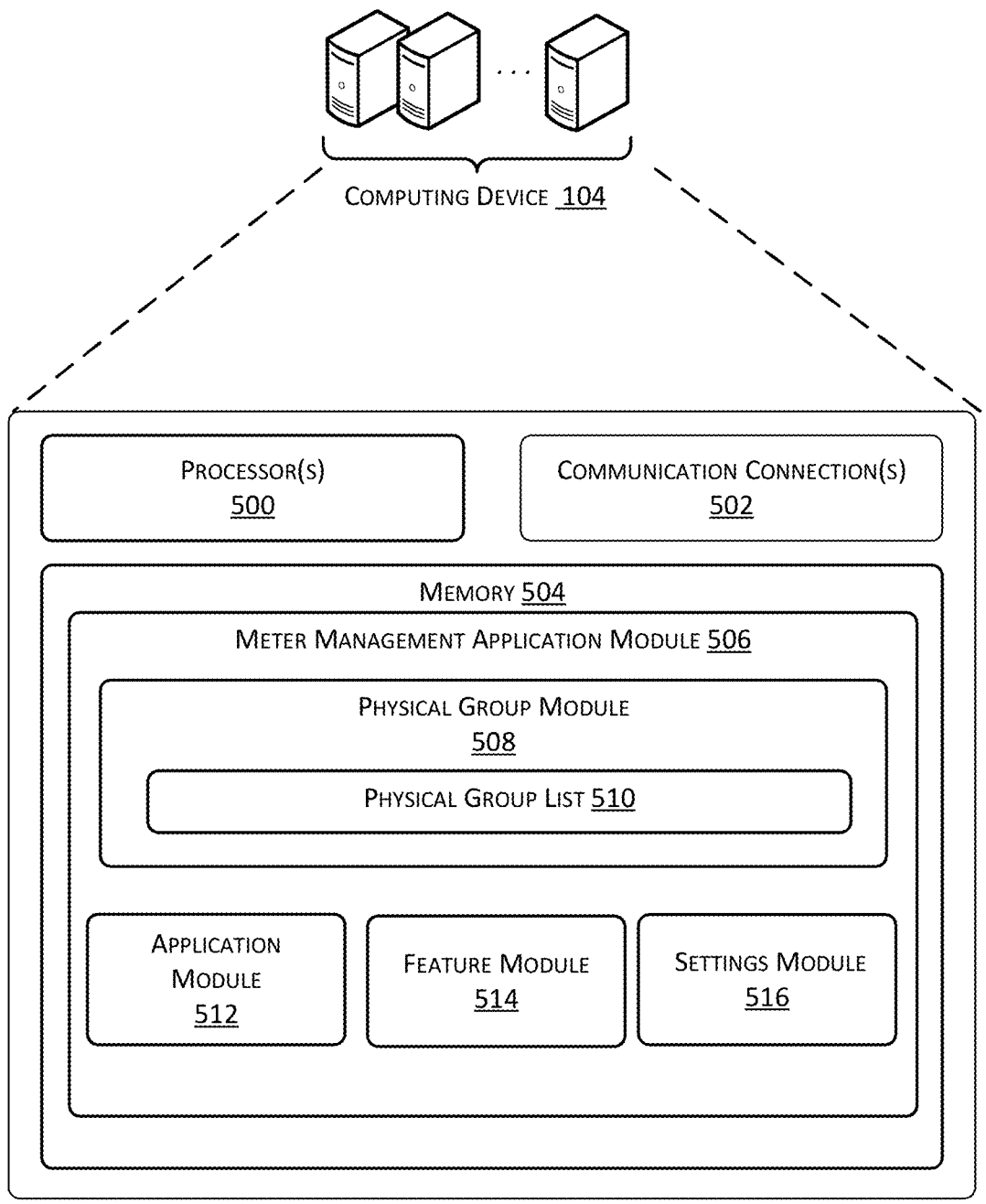
FIG. 5 is a block diagram illustrating details of an example second entity computing device, the second entity being an example of one of the multiple entities shown in FIG. 1.

FIG. 5 illustrates an example computing device 104 of FIG. 1 in more detail. The computing device 104 may be configured as or disposed at a server, a cluster of servers, a server farm, a data center, a cloud computing resource, or any other computing resource capable of storing and/or providing access to a meter management application, such as the meter management application 204. In some examples, the computing device 104 may be associated with a second entity comprising a utility supplier entity that provides a physical resource such as electricity, water, or gas to one more sites via a physical distribution network (e.g., the wires and pipes through which the resource passes to reach the sites). The computing device 104 may include one or more processors 500, one or more communication connections 502, and memory 504. The memory 504 may include a plurality of modules to implement various functions of the computing device 104. A meter management application module 506 may be configured to communicate with the group management service module 406 of the computing device 102 and to communicate with the smart sensor(s) 108. For example, a physical group module 508 may store a physical group list 510 that stores a list of each physical group and the corresponding smart sensors 108 in each physical group along with an association between an entity and each physical group. When the meter management application module 506 receives an indication from the computing device 102 that a new group has been created, then the physical group module 508 may update the physical group list 510 to include the new physical group and which smart sensors 108 are to be included in the new physical group.

An application module 512 may be configured to store applications and application related information, similar to the application module 418, that can be transmitted to the smart sensor(s) 108. For example, when a physical group is created in the physical group module 508 the application module 512 may send an instruction to the smart sensor(s) 108 that are listed in the physical group to adjust settings of features that are stored on the smart sensors 108 based on a type of application that is selected.

A feature module 514 may be configured to store features and related feature information that may be transmitted to the smart sensors 108. For example, when the computing device 104 receives an instruction to create a physical group, the instruction may include activating or deactivating certain features stored on the smart sensor 108 based on the nature of the application.

A settings module 516 may be configured to store settings for each feature associated with an application. For example, when the computing device 104 receives an instruction to create a physical group, the instruction may include adjusting a setting of a feature stored on the smart sensor(s) 108 that form the physical group. The computing device 104 may also receive a default setting for each feature that is to be applied to the feature when the computing device 104 sends an instruction to the smart sensor(s) 108 to join the group. In some cases, in which a physical group already exists, the computing device 104 may receive an instruction from the computing device 102 to adjust a setting of a feature of an application stored on the smart sensor(s) 108. In this case, the settings module 516 may update the appropriate feature setting and may send an instruction to the smart sensor(s) 108 to adjust the specified feature setting. In some cases, the smart sensor(s) 108 may send a confirmation to the computing device 104 that the specified feature setting has been adjusted.

Example Smart Sensor

Figure 6:
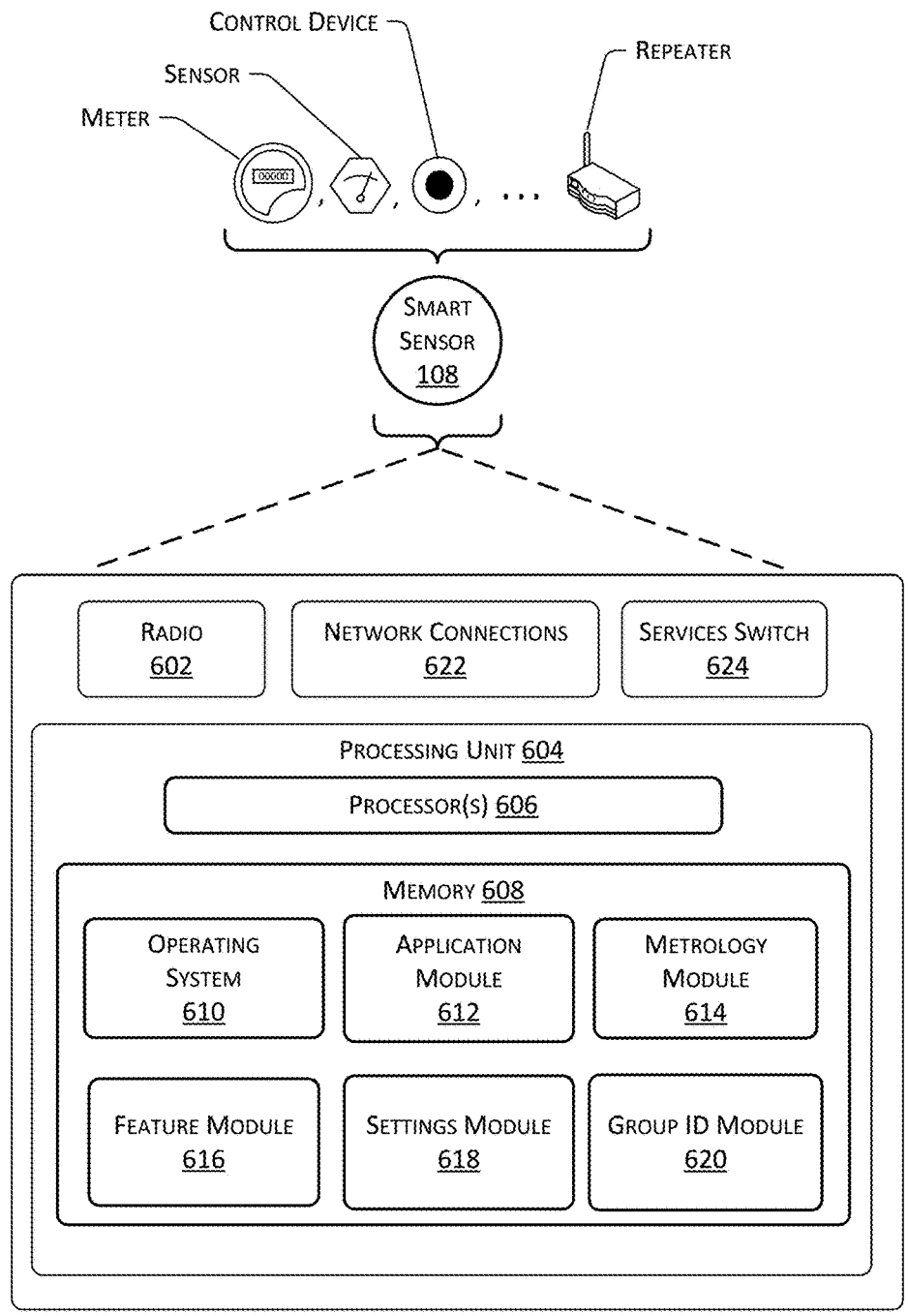
FIG. 6 is a block diagram illustrating details of an example smart sensor, the smart sensor being an example of one of the multiple smart sensors shown in FIG. 1.

FIG. 6 is a diagram showing example details of an individual smart sensor 108. As discussed above, the smart sensor may comprise a smart utility meter (e.g., electricity meter, water meter, or gas meter), a relay, a repeater, a smart grid router, a transformer, or any other utility network computing device. The smart sensor 108 may be configured for interaction with other smart sensor(s) 108, the computing device 102, the computing device 104, the computing device 106, as well as potentially other computing devices (e.g., consumer computing devices, utility network computing devices, web services, and the like). As noted above, in some examples, the smart sensor 108 may comprise a smart utility meter.

As shown in the example of FIG. 6, the smart sensor 108 may include a radio 602, a processing unit 604, and a services switch 624. The radio 602 may provide two-way RF communication with other smart sensors 108 and/or other computing devices via the network 112. The processing unit 604 may include one or more processors 606 and memory 608 and/or other hardware device(s), such as an application specific integrated circuit (ASIC), a gate array or other hardware-based logic device. The memory 608 may include an operating system (OS) 610 and application information stored in an application module 612.

In embodiments in which the smart sensor 108 comprises a utility meter, the smart sensor 108 may include a metrology module 614 configured to receive consumption data of a resource (e.g., electricity, water, or gas) at a site of the meter. The metrology module 614 may report the consumption data to the computing device 102 or the computing device 104 by RF transmission via the radio 602. The consumption data may be formatted and/or packetized in a manner or protocol for transmission over the utility communication network.

In addition to the radio 602, the smart sensor 108 may include one or more other network connections 622, such as power line communications (PLC) connections, Ethernet or other wired network connections, RF connections, cellular communication connections, or the like. As such, the smart sensor 108 may also include any ancillary hardware, modules, and/or interfaces associated with or needed for the operation of the particular network connections.

A feature module 616 may be configured to store features and feature related information that are associated with applications. For example, when the smart sensor 108 receives an instruction causing features stored on the smart sensor 108 to activate or deactivate. These features may include reporting data to the computing device 102 or the computing device 104, determining a location of the smart sensor 108, measuring a consumption of a resource, etc.

A settings module 618 may be configured to store settings for each feature associated with an application. For example, each feature may have an adjustable setting that a user can change based on the type of data that the user would like to collect or a frequency in which the data should be collected or transmitted. These settings may cause the smart sensor 108 to report data at a specified rate, determine a location of the smart sensor 108 within a defined amount of precision, measure a utility consumption within a defined amount of precision, etc.

A group identification module 620 may be configured to store group identification information related to a physical group that the smart sensor 108 may be associated with. For example, the smart sensor 108 may receive instructions from the computing device 104 to join a physical group and the instructions may include a physical group identification number. The group identification module 620 may store the group identification number. In some cases, the group identification module 620 may store multiple group identification numbers if the smart sensor 108 is a member of multiple groups. In some cases, the smart sensor 108 may store a group identification number of a different smart sensor 108, such as a neighboring smart sensor 108(1), such that if the smart sensor 108 receives a transmission for a group that includes the smart sensor 108(1), then the smart sensor 108 can forward the message to the smart sensor 108(1).

The OS 610, the application module 612, the metrology 614, the feature module 616, the settings module 618, the group identification module 620, and even software aspects of the radio 602 are all examples of applications that may be executable by the smart sensor 108.

Memories 504 and 608 are shown to include software functionality configured as one or more "modules." However, the modules are intended to represent example divisions of the software for purposes of discussion and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

While detailed examples of certain computing devices (e.g., computing device 102, computing device 104, and smart sensors 108) are described above, it should be understood that even those computing devices not described in detail may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing.

The various memories described herein are examples of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example User Interface(s)

Figure 7B:
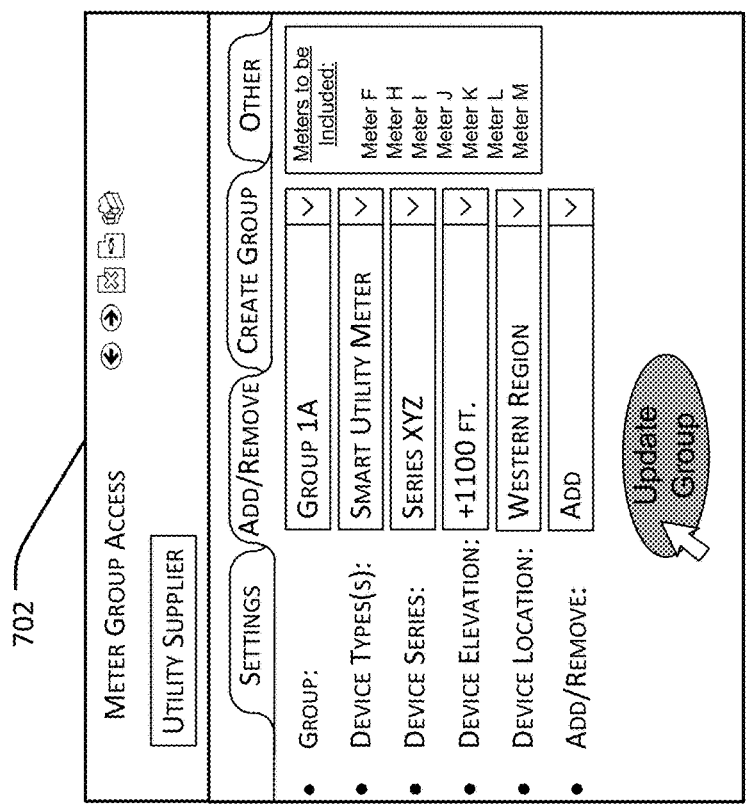
FIG. 7B is a schematic diagram of an example graphical user interface usable by one or more of multiple entities to facilitate management of groups of one or more smart utility meters or other smart sensors.
Figure 7A:
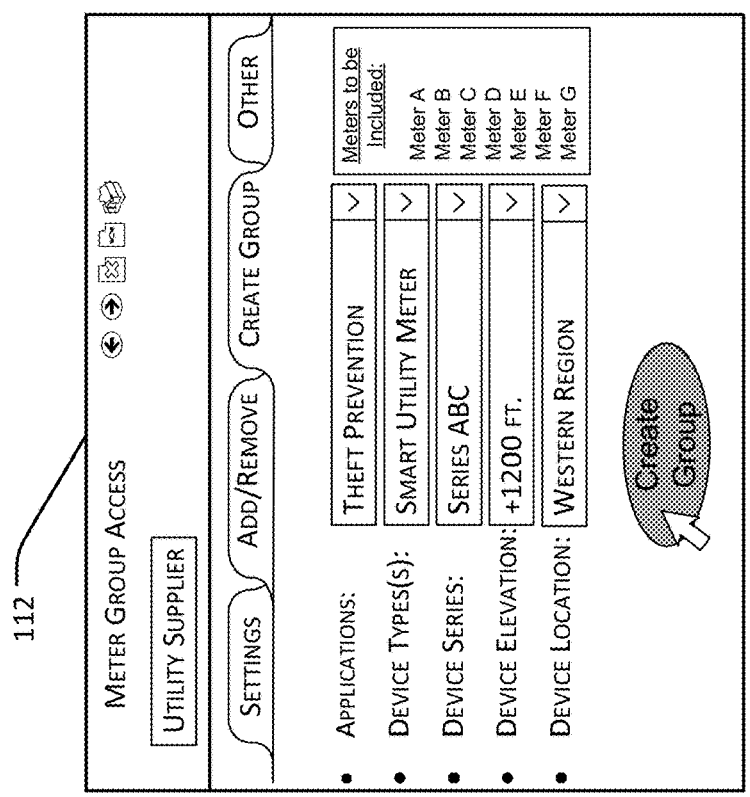
FIG. 7A is a schematic diagram of an example graphical user interface usable by one or more of multiple entities to facilitate management of groups of one or more smart utility meters or other smart sensors.

FIG. 7A illustrates an example user interface 112 that may be presented to the user to allow the user to access the group management service 202 and to establish or create groups of smart sensors 108. As shown, when the user (in this case, a user associated with a utility supplier) selects to create a group by selecting the "Create Group" tab, multiple options may be presented to specify characteristics of the group. For instance, in the illustrated example, the user interface 112 may include "applications" (i.e., which application will be associated with the smart sensors 108 that join the group), "device type(s)" (i.e., which types of devices will join the group), "device series" (i.e., which series or model of the device types will join the group), "device elevation" (i.e., an elevation threshold needed to join the group), and "device location." The characteristics for creating a group may include any or all of the characteristics shown in the illustrated example as well as any other characteristics that may be used to specify or describe a smart sensor 108. The characteristic controls are shown as drop-down menus, but could be a series of radio buttons, check boxes, free text entry fields, tree-view, or any other control usable to specify one or more devices that will join the group and in which will be associate with the application. Additionally, the user interface 112 may include a "Meters to be Included" field that may populate as each characteristic is filled out. For instance, in the illustrated example, each of Meters A-G meet the criteria of being a "Smart Utility Meter," being a "Series ABC," being above "1,200 FT." in elevation, and being in the "Western Region." Once the characteristics for the group have been selected, the user may select the "Create Group" button and the group management service 202 may send an instruction to the computing device 104 causing the computing device 104 to send an instruction to the smart sensor(s) 108 causing the smart sensor(s) 108 to activate features stored on the smart sensor(s) 108 that are associated with the application.

FIG. 7B also illustrates a user interface 702 that may be presented to the user to allow the user to access the group management service 202 and to add or remove a smart sensor(s) 108 from a group. The user interface 702 may be presented in response to the group management service 202 determining a credential or a permission associated with the user accessing the user interface 702. As shown, when the user (in this case, a user associated with the utility supplier) selects to add or remove a smart sensor(s) 108 by selecting the "Add/Remove" tab, multiple options may be presented to specify characteristics of the smart sensors(s) 108 to be removed or added. For instance, in the illustrated example, the user interface 702 may include "Group" (i.e., the group in which the user would like to add or remove a device), "device type(s)" (i.e., which types of devices will be added to or removed from the group), "device series" (i.e., which series or model of the device types will be added to or removed from the group), "device elevation" (i.e., an elevation threshold needed to be added to or removed from the group), and "device location." The characteristics for adding to or removing from a group may include any or all of the characteristics shown in the illustrated example as well as any other characteristics that may be used to specify a smart sensor 108. As with user interface 112, the characteristic controls are shown as drop-down menus, but could be a series of radio buttons, check boxes, free text entry fields, tree view, or any other control usable to specify one or more devices that will join the group. Additionally, the user interface 702 may include a "Meters to be Included" field that may populate as each characteristic is filled out. For instance, in the illustrated example, each of Meters F-M meet the criteria of being a "Smart Utility Meter," being a "Series XYZ," being above "1,100 FT." in elevation, and being in the "Western Region." Once the characteristics for the group have been selected and the user has selected to either remove or add the specified devices (in this example the devices are being added) the user may select the "Update Group" button and the group management service 202 may send an instruction to the computing device 104 causing the computing device 104 to send an instruction to the smart sensor(s) 108 causing the smart sensor(s) 108 to activate features stored on the smart sensor(s) 108 that are associated with the applications. Alternatively, if the user selects the "remove" option, then the group management service 202 may send an instruction to the computing device 104 causing the computing device 104 to send an instruction to the smart sensor(s) 108 causing the smart sensor(s) 108 to deactivate features stored on the smart sensor(s) 108 that are associated with the application.

Figure 8:
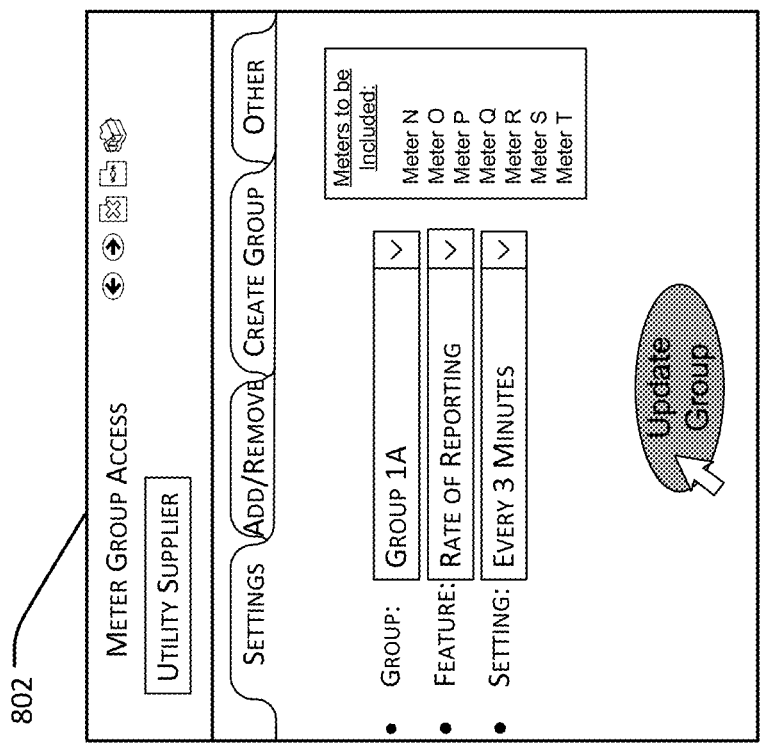
FIG. 8 is a schematic diagram of an example graphical user interface usable by one or more of multiple entities to facilitate management of groups of one or more smart utility meters or other smart sensors.

FIG. 8 illustrates a user interface 802 that may be presented to the user to allow the user to adjust settings of features associated with the application that is associated with a group of smart sensor(s) 108. The user interface 702 may be presented in response to the group management service 202 determining a credential or a permission associated with the user accessing the user interface 702. As shown, when the user (in this case, a user associated with the utility supplier) selects to adjust the settings by selecting the "Settings" tab, multiple options may be presented to specify characteristics of the setting to be adjusted. For instance, in the illustrated example, the user interface 802 may include "Group" (i.e., the group in which the user would like to adjust a setting of a feature), "Feature" (i.e., which feature the user would like to adjust), and "Setting" (i.e., the setting at which the feature should be adjusted too). The characteristics for adjusting a setting of a feature may include any or all of the characteristics shown in the illustrated example as well as any other characteristics that may be used to specify a group and a feature. The settings presented to the user may be determined by the credential or the permission of the user. As with user interface 112 and user interface 702, the characteristic controls are shown as drop-down menus, but could be a series of radio buttons, check boxes, free text entry fields, tree view, or any other control usable to specify one or more devices that will join the group. Additionally, the user interface 112 may include a "Meters to be Included" field that may populate as each characteristic is filled out. For instance, in the illustrated example, each of Meters N-T meet the criteria of being part of "Group 1A" and having a "Rate of Reporting" feature. Once the characteristics for the group have been selected, the user may select the "Update Group" button and the group management service 202 may send an instruction to the computing device 104 causing the computing device 104 to send an instruction to the smart sensor(s) 108 causing the smart sensor(s) 108 to adjust the settings of the features stored on the smart sensor(s) 108 that are associated with the applications.

Example Method(s) of Establishing a Group

Figure 9:
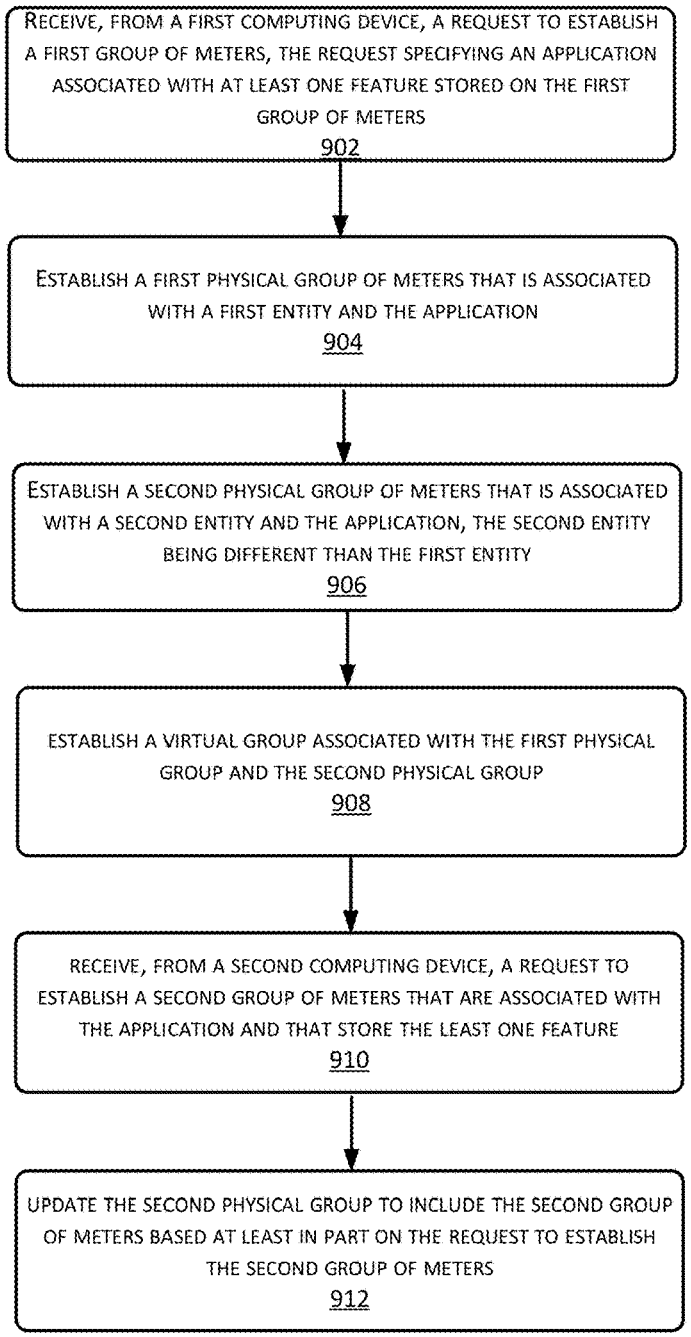
FIG. 9 is a flowchart of an example method that may be implemented by one or more of multiple entities to facilitate management of groups of one or more smart utility meters or other smart sensors.

FIG. 9 is a flowchart which illustrates an example flow of operations 900 that may be performed by a first computing resource, such as third-party 104, to facilitate establishing a group of one or more smart sensors in which an application is to be associated with. The example flow of operations 900 is described in the context of the example of architecture 100 and with reference to the devices illustrated in FIG. 1. However, the flow of operations 900 is not limited to use with the architecture 100 and devices of FIG. 1 and may be implemented using other architectures and devices.

The flow of operations 900 may begin, at block 902, with a first computing device receiving, from another computing device, a request to establish a first group of meters, the request specifying an application associated with at least one feature stored on the first group of meters. In some examples, a user (e.g., a first entity employee, second entity employee, consumer, or other user) may access a user interface 112 using the computing device 106. Using a web browser or an app store client program resident on computing device 106, the user may access a website or other interface to a smart sensor group management service that may be operated by the computing device 102. For instance, the user interface 112 may present options to the user for creating groups, adding smart sensors to existing groups, removing smart sensors from existing groups, or adjusting feature settings of applications that are installed on the smart sensors 108 in an existing group. The user interface 112 may request a credential, such as a username or a password, of the user when accessing the user interface 112 to determine an identity of the user or an association of the user with one or more entities. The user may request to establish a group of smart sensors 108 for an application to be associated with.

At 904, the first computing device may establish a first physical group of meters that is associated with a first entity and the application. At 906, the first computing device may establish a second physical group of meters that is associated with a second entity and the application, the second entity being different than the first entity. At 908, the first computing device may establish a virtual group associated with the first physical group and the second physical group. In one example, once the identity or the association of the user is known and the credential and/or permission of the user is known, the computing device 102 may establish a first physical group 114 that is associated with the user that initially accessed the user interface 112 and a second physical group 116 that is associated with a different user (e.g., the computing device 104). In cases where the user is associated with the computing device 104, then the first physical group 114 may be associated with the computing device 104 and the second physical group 116 may be associated with the computing device 102. The physical groups 114 and 116 may each comprise a number of smart sensors 108 selected by the user. Establishing the physical groups 114 and 116 may cause the smart sensors 108 that make up each of the physical groups 114 and 116 to adjust settings of features that are stored on the smart sensors 108 based on an application selected by the user.

At 910, the first computing device may receive, from a second computing device, a request to establish a second group of meters that are associated with the application and that store the least one feature. In one example, once the physical group 114, the physical group 116, and the virtual group 118 have been established, the group management service may allow multiple users to manage the smart sensors 108 that make up the physical groups 114 and 116. For instance, when a user accesses the user interface 112, the group management service may determine an association of the user and determine a credential and/or a permission of the user. Once the credential and/or permission of the user is determined, the group management service may present, via the user interface 112, the virtual group 118 displaying different options for managing either the physical group 114 or the physical group 116, depending on the association of the user. In one example, if the user is associated with a first entity and the physical group 114 is also associated with the first entity, then the user interface 112 may present information that pertains to the physical group 114.

At 912, the first computing device may update the second physical group to include the second group of meters based at least in part on the request to establish the second group of meters. In one example, the group management service 202 may determine which physical group that the user is associated with based on the credential and/or permission of the user. If the user selects to add a smart sensor 108 or multiple smart sensors 108 and the user is associated with the physical group 114, then the group management service 202 may update the physical group 114 to reflect the added smart sensor(s) 108. If the user selects to add a smart sensor 108 or multiple smart sensors 108 and the user is associated with the physical group 116, then the group management service 202 may update the physical group 116 to reflect the added smart sensor(s) 108.

Example Method(s) of Updating a Group

Figure 10:
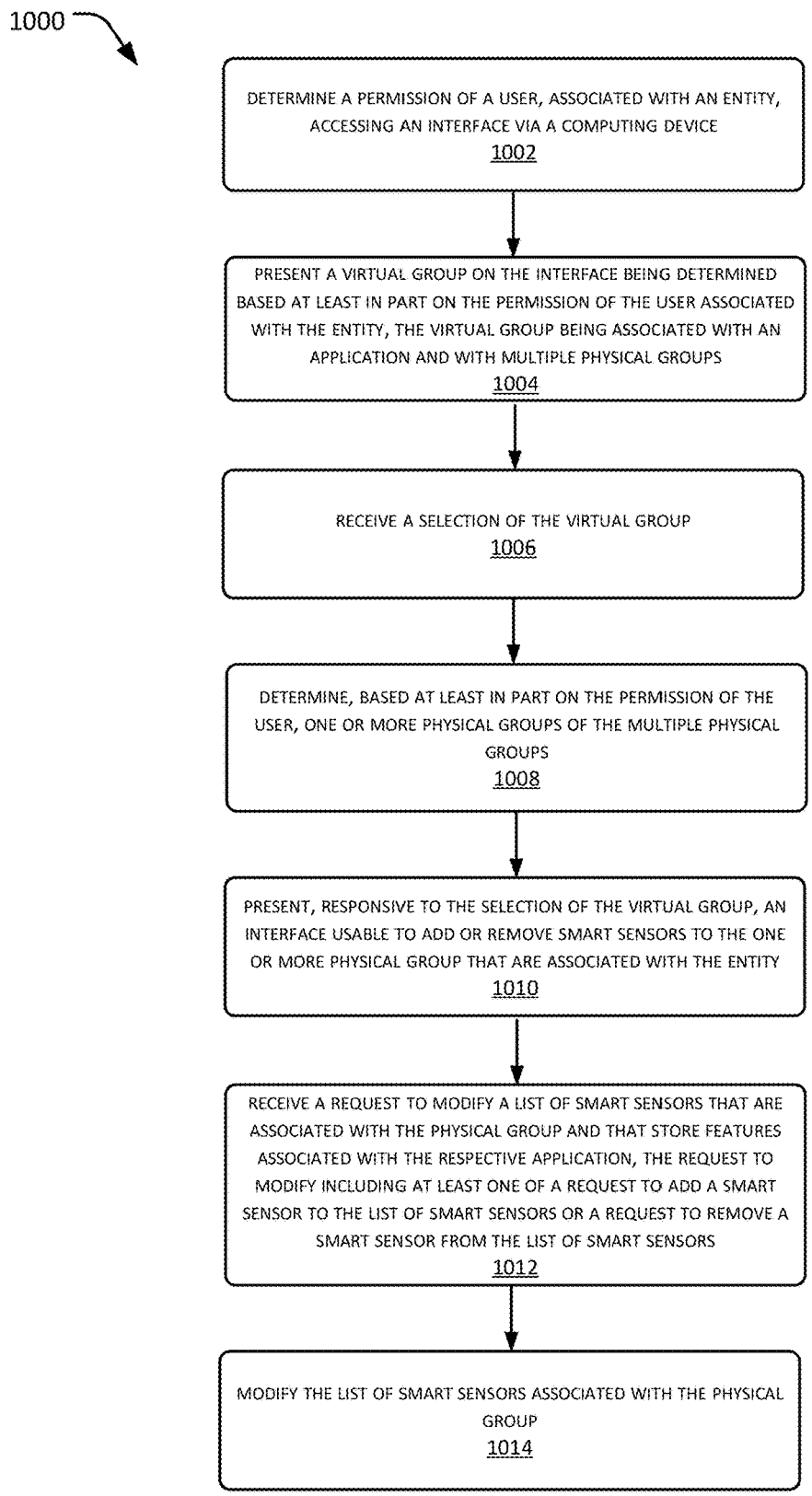
FIG. 10 is a flowchart of another example method that may be implemented by one or more of multiple entities to facilitate management of groups of one or more smart utility meters or other smart sensors.

FIG. 10 is a flowchart which illustrates an example flow of operations 1000 that may be performed by a first computing resource, such as computing device 102, to facilitate adding or removing one or more smart sensors to a group of one or more smart sensors. The example flow of operations 1000 is described in the context of the example of architecture 100 and with reference to the devices illustrated in FIG. 1. However, the flow of operations 1000 is not limited to use with the architecture 100 and devices of FIG. 1 and may be implemented using other architectures and devices.

The flow of operations 1000 may begin, at block 1002, with a first computing device determining a permission of a user, associated with an entity, accessing an interface via a computing device. In some examples, the group management service 202 may determine a credential and/or a permission of a user based on an association of the user with an entity.

At 1004, the first computing device may present a virtual group on the interface being determined based at least in part on the permission of the user associated with the entity, the virtual group being associated with an application and with multiple physical groups. In some examples, the group management service 202 may present a list of virtual groups based on the credential and/or permission of the user, each virtual group being associated with a different application and multiple physical groups.

At 1006, the first computing device may receive a selection of the virtual group. In some examples, the user may select a virtual group (e.g., the virtual group 118) and select a specific smart sensor 108 or may select multiple smart sensors 108 to either add or remove from virtual group 118.

At 1008, the first computing device may determine, based at least in part on the permission of the user, one or more physical groups of the multiple physical groups. In some examples, the group management service 202 may determine which physical group that the user is associated with based on the credential and/or permission of the user.

At 1010, the first computing device may present, responsive to the selection of the virtual group, an interface usable to add or remove smart sensors to the one or more physical group that are associated with the entity. In some examples, a user interface 702 may be presented to the user to allow the user to access the group management service 202 and to add or remove a smart sensor(s) 108 from a group. The user interface 702 may be presented in response to the group management service 202 determining a credential or a permission associated with the user accessing the user interface 702. As shown, when the user (in this case, a user associated with the utility supplier) selects to add or remove a smart sensor(s) 108 by selecting the "Add/Remove" tab, multiple options may be presented to specify characteristics of the smart sensors(s) 108 to be removed or added. For instance, in the illustrated example, the user interface 702 may include "Group" (i.e., the group in which the user would like to add or remove a device), "device type(s)" (i.e., which types of devices will be added to or removed from the group), "device series" (i.e., which series or model of the device types will be added to or removed from the group), "device elevation" (i.e., an elevation threshold needed to be added to or removed from the group), and "device location." The characteristics for adding to or removing from a group may include any or all of the characteristics shown in the illustrated example as well as any other characteristics that may be used to specify a smart sensor 108. As with user interface 112, the characteristic controls are shown as drop-down menus, but could be a series of radio buttons, check boxes, free text entry fields, tree view, or any other control usable to specify one or more devices that will join the group. Additionally, the user interface 702 may include a "Meters to be Included" field that may populate as each characteristic is filled out. For instance, in the illustrated example, each of Meters F-M meet the criteria of being a "Smart Utility Meter," being a "Series XYZ," being above "1,100 FT." in elevation, and being in the "Western Region." Once the characteristics for the group have been selected and the user has selected to either remove or add the specified devices (in this example the devices are being added) the user may select the "Update Group" button and the group management service 202 may send an instruction to the computing device 104 causing the computing device 104 to send an instruction to the smart sensor(s) 108 causing the smart sensor(s) 108 to activate features stored on the smart sensor(s) 108 that are associated with the applications. Alternatively, if the user selects the "remove" option, then the group management service 202 may send an instruction to the computing device 104 causing the computing device 104 to send an instruction to the smart sensor(s) 108 causing the smart sensor(s) 108 to deactivate features stored on the smart sensor(s) 108 that are associated with the application.

At 1012, the first computing device may receive a request to modify a list of smart sensors that are associated with the physical group and that store features associated with the respective application, the request to modify including at least one of a request to add a smart sensor to the list of smart sensors or a request to remove a smart sensor from the list of smart sensors. At 1014, the first computing device may modify the list of smart sensors associated with the physical group. In some examples, if the user selects to add a smart sensor 108 or multiple smart sensors 108 and the user is associated with the physical group 114, then the group management service 202 may update the physical group 114 to reflect the added smart sensor(s) 108. If the user selects to add a smart sensor 108 or multiple smart sensors 108 and the user is associated with the physical group 116, then the group management service 202 may update the physical group 116 to reflect the added smart sensor(s) 108.

Example Method(s) of Adjusting a Setting of a Feature

Figure 11:
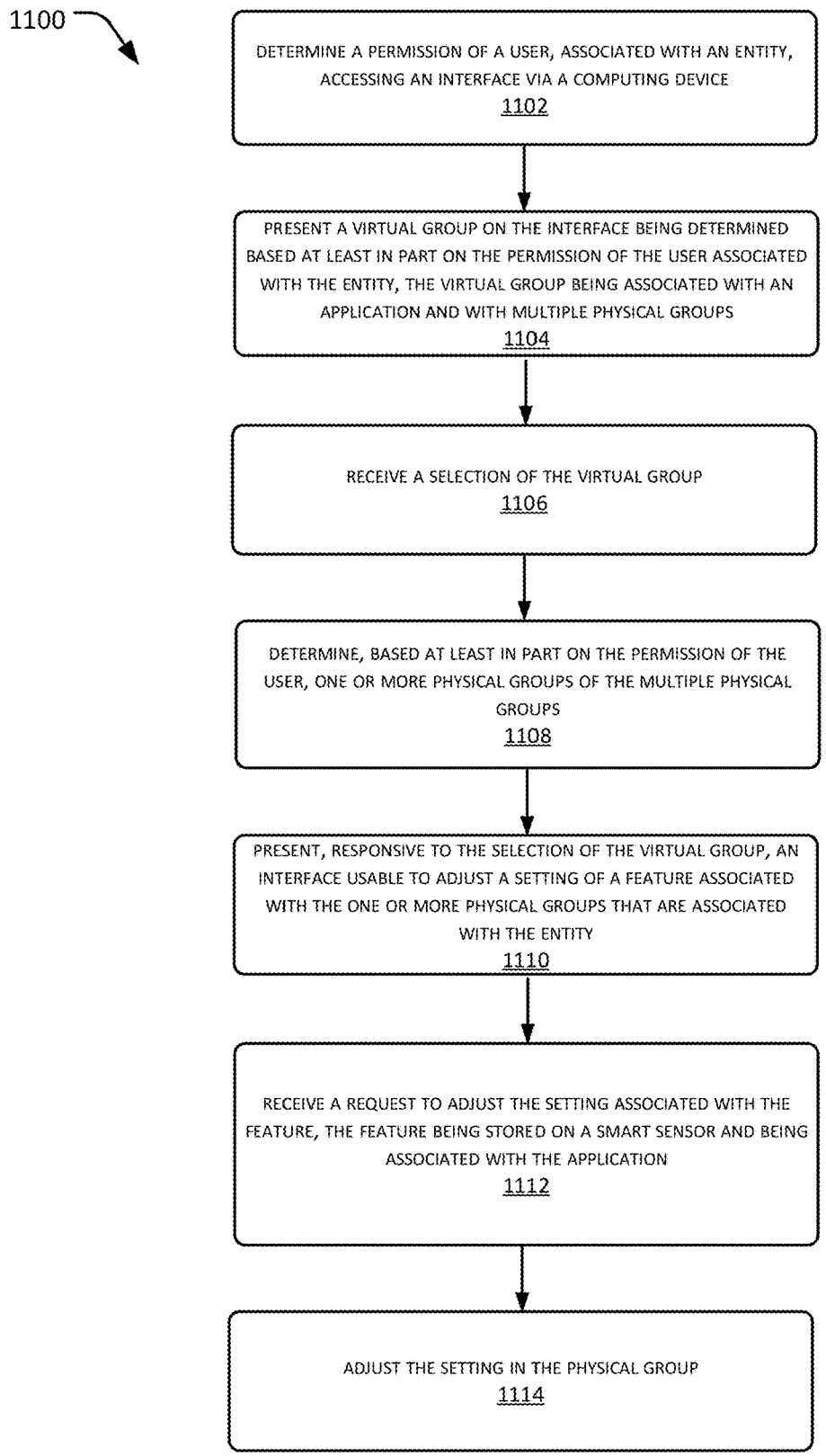
FIG. 11 is a flowchart of another example method that may be implemented by one or more of multiple entities to facilitate management of groups of one or more smart utility meters or other smart sensors.

FIG. 11 is a flowchart which illustrates an example flow of operations 1100 that may be performed by a first computing resource, such as computing device 102, to facilitate adjusting a feature of an application associated with one or more smart sensors. The example flow of operations 1100 is described in the context of the example of architecture 100 and with reference to the devices illustrated in FIG. 1. However, the flow of operations 1100 is not limited to use with the architecture 100 and devices of FIG. 1 and may be implemented using other architectures and devices.

The flow of operations 1100 may begin, at block 1102, with a first computing device determining a permission of a user, associated with an entity, accessing an interface via a computing device. In some examples, the group management service 202 may determine a credential and/or a permission of a user based on an association of the user with an entity.

At 1104, the first computing device may present a virtual group on the interface being determined based at least in part on the permission of the user associated with the entity, the virtual group being associated with an application and with multiple physical groups. In some examples, the group management service 202 may present a list of virtual groups based on the credential and/or permission of the user, each virtual group being associated with a different application and multiple physical groups.

At 1106, the first computing device may receive a selection of the virtual group. In some examples, the user may select a virtual group (e.g., the virtual group 118) and select a specific smart sensor 108 or may select multiple smart sensors 108 to either add or remove from virtual group 118.

At 1108, the first computing device may determine, based at least in part on the permission of the user, one or more physical groups of the multiple physical groups. In some examples, the group management service 202 may determine which physical group that the user is associated with based on the credential and/or permission of the user.

At 1110, the first computing device may present, responsive to the selection of the virtual group, an interface usable to adjust a setting of a feature associated with the one or more physical groups that are associated with the entity. In some examples, a user interface 802 may be presented to the user to allow the user to adjust settings of features associated with applications that are associated with a smart sensor(s) 108. The user interface 702 may be presented in response to the group management service 202 determining a credential or a permission associated with the user accessing the user interface 702. As shown, when the user (in this case, a user associated with the utility supplier) selects to adjust the settings by selecting the "Settings" tab, multiple options may be presented to specify characteristics of the setting to be adjusted. For instance, in the illustrated example, the user interface 802 may include "Group" (i.e., the group in which the user would like to adjust a setting of a feature), "Feature" (i.e., which feature the user would like to adjust), and "Setting" (i.e., the setting at which the feature should be adjusted too). The characteristics for adjusting a setting of a feature may include any or all of the characteristics shown in the illustrated example as well as any other characteristics that may be used to specify a group and a feature. The settings presented to the user may be determined by the credential or the permission of the user. As with user interface 112 and user interface 702, the characteristic controls are shown as drop-down menus, but could be a series of radio buttons, check boxes, free text entry fields, tree view, or any other control usable to specify one or more devices that will join the group. Additionally, the user interface 112 may include a "Meters to be Included" field that may populate as each characteristic is filled out. For instance, in the illustrated example, each of Meters N-T meet the criteria of being part of "Group 1A" and having a "Rate of Reporting" feature. Once the characteristics for the group have been selected, the user may select the "Update Group" button and the group management service 202 may send an instruction to the computing device 104 causing the computing device 104 to send an instruction to the smart sensor(s) 108 causing the smart sensor(s) 108 to adjust the settings of the features stored on the smart sensor(s) 108 that are associated with the applications.

At 1112, the first computing device may receive a request to adjust the setting associated with the feature, the feature being stored on a smart sensor and being associated with the application. At 1114, the first computing device may adjust the setting in the physical group. In some examples, the group management service 202 may present different settings that can be adjusted by the user based on the credential and/or the permission of the user. For instance, if the group management service 202 determines that the user is associated with a first entity, then the group management service 202 may cause the user interface 112 to only present features that are associated with the physical group associated with the first entity (e.g., physical group 114). Alternatively, if the group management service 202 determines that the user is associated with the second entity, then the group management service 202 may cause the user interface 112 to only present features that are associated with the physical group of the second entity (e.g., physical group 116). Each physical group 114 and 116 may include different settings for features that are adjustable by their respective associated user such that a user associated with the first entity may adjust a set of features associated with the application that are different than a set of features that may be adjusted by a user associated with the second entity. In some instances, a user associated with the first entity may have access to a physical group that it is not associated with and may have the authority to adjust settings that are not included in the physical group that it is associated with.

The flows of operations illustrated in FIGS. 9-11 are illustrated as collections of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, perform the recited operations. In the context of hardware, the blocks may represent one or more circuits (e.g., application specific integrated circuits—ASICs) configured to execute the recited operations.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
a processor; and
memory storing executable instructions that, when executed by the processor, cause the system to perform acts comprising:
determining a permission of a user, associated with an entity, accessing an interface via a computing device;
presenting a virtual group on the interface being determined based at least in part on the permission of the user associated with the entity, the virtual group being associated with an application and with multiple physical groups;
receiving a selection of the virtual group;
determining, based at least in part on the permission of the user, a first physical group of the multiple physical groups or a second physical group of the multiple physical groups;
presenting, responsive to the selection of the virtual group, an interface usable to add or remove smart sensors to or from the first physical group or the second physical group based at least in part on the permission of the user;
receiving a request to modify a list of smart sensors that are associated with the first physical group or the second physical group and that store features associated with the respective application, the request to modify including at least one of a request to add a smart sensor to the list of smart sensors or a request to remove a smart sensor from the list of smart sensors; and
modifying the list of smart sensors associated with the first physical group or the second physical group.

2. The system of claim 1, wherein modifying the list of smart sensors associated with the first physical group or the second physical group includes refraining from modifying a list of smart sensors associated with the second physical group of the multiple physical groups that are associated with the virtual group.

3. The system of claim 1, wherein the request to modify the list of smart sensors includes at least one characteristic and the acts further comprise causing presentation of a list of meters that have the at least one characteristic.

4. The system of claim 1, wherein the list of smart sensors comprises a first list of smart sensors that is associated with the first physical group and the system further comprises a second list of smart sensors that is associated with the second physical group of the multiple physical groups, the first physical group and the second physical group being associated with the virtual group.

5. The system of claim 1, the acts further comprising sending instructions to a utility supplier computing device to modify a list of smart sensors in a corresponding physical group stored at the utility supplier computing device.

6. A method comprising:
determining a permission of a user, associated with an entity, accessing an interface via a computing device;
presenting a virtual group on the interface being determined based at least in part on the permission of the user associated with the entity, the virtual group being associated with an application and with multiple physical groups;
receiving a selection of the virtual group;
determining, based at least in part on the permission of the user, a first physical group of the multiple physical groups or a second physical group of the multiple physical groups;
presenting, responsive to the selection of the virtual group, an interface usable to add or remove smart sensors to or from the first physical group or the second physical group based at least in part on the permission of the user;
receiving a request to modify a list of smart sensors that are associated with the first physical group or the second physical group and that store features associated with the respective application, the request to modify including at least one of a request to add a smart sensor to the list of smart sensors or a request to remove a smart sensor from the list of smart sensors; and modifying the list of smart sensors associated with the first physical group or the second physical group.

7. The method of claim 6, wherein modifying the list of smart sensors associated with the first physical group or the second physical group includes refraining from modifying a list of smart sensors associated with the second physical group of the multiple physical groups that are associated with the virtual group.

8. The method of claim 6, wherein the request to modify the list of smart sensors includes at least one characteristic and the method further comprises causing presentation of a list of meters that have the at least one characteristic.

9. The method of claim 6 wherein the list of smart sensors comprises a first list of smart sensors that is associated with the first physical group and the method further comprises a second list of smart sensors that is associated with the second physical group of the multiple physical groups, the first physical group and the second physical group being associated with the virtual group.

10. The method of claim 6, the method further comprising sending instructions to a utility supplier computing device to modify a list of smart sensors in a corresponding physical group stored at the utility supplier computing device.

11. The method of claim 6, wherein the request comprises a first request and the method further comprising receiving a second request to modify a setting of the features associated with the respective application.

12. The method of claim 6, wherein the entity comprises a first entity and at least one feature of the features associated with the respective application includes:
  a first setting that is associated with the first physical group and is adjustable by the first entity; and
  a second setting that is associated with the second physical group and is adjustable by a second entity and the first entity;
  wherein the first setting and the second setting are different and the first setting is not adjustable by the second entity.

13. One or more non-transitory computer-readable medium storing instructions that, when executed by one or more processors, configure the one or more processors to perform acts comprising:
  determining a permission of a user, associated with an entity, accessing an interface via a computing device;
  presenting a virtual group on the interface being determined based at least in part on the permission of the user associated with the entity, the virtual group being associated with an application and with multiple physical groups;
  receiving a selection of the virtual group;
  determining, based at least in part on the permission of the user, a first physical group of the multiple physical groups or a second physical group of the multiple physical groups;

presenting, responsive to the selection of the virtual group, an interface usable to add or remove smart sensors to or from the first physical group or the second physical group based at least in part on the permission of the user;

receiving a request to modify a list of smart sensors that are associated with the first physical group or the second physical group and that store features associated with the respective application, the request to modify including at least one of a request to add a smart sensor to the list of smart sensors or a request to remove a smart sensor from the list of smart sensors; and modifying the list of smart sensors associated with the first physical group or the second physical group.

14. The one or more non-transitory computer-readable medium of claim 13, wherein modifying the list of smart sensors associated with the first physical group or the second physical group includes refraining from modifying a list of smart sensors associated with the second physical group of the multiple physical groups that are associated with the virtual group.

15. The one or more non-transitory computer-readable medium of claim 13, wherein the request to modify the list of smart sensors includes at least one characteristic and the acts further comprise causing presentation of a list of meters that have the at least one characteristic.

16. The one or more non-transitory computer-readable medium of claim 13, wherein the list of smart sensors comprises a first list of smart sensors that is associated with the first physical group and the list of smart sensors further comprise a second list of smart sensors that is associated with the second physical group of the multiple physical groups, the first physical group and the second physical group being associated with the virtual group.

17. The one or more non-transitory computer-readable medium of claim 13, the acts further comprising sending instructions to a utility supplier computing device to modify a list of smart sensors in a corresponding physical group stored at the utility supplier computing device.

18. The one or more non-transitory computer-readable medium of claim 13, wherein the request comprises a first request and the acts further comprising receiving a second request to modify a setting of the features associated with the respective application.

19. The one or more non-transitory computer-readable medium of claim 13, wherein the entity comprises a first entity and at least one feature of the features associated with the respective application includes:
  a first setting that is associated with the first physical group and is adjustable by the first entity; and
  a second setting that is associated with the second physical group and is adjustable by a second entity and the first entity.

20. The one or more non-transitory computer-readable medium of claim 19, wherein the first setting and the second setting are different and the first setting is not adjustable by the second entity.

* * * * *